US010628333B2

(12) United States Patent
Kakutani

(10) Patent No.: US 10,628,333 B2
(45) Date of Patent: Apr. 21, 2020

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Naoya Kakutani, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 100 days.

(21) Appl. No.: 15/660,206

(22) Filed: Jul. 26, 2017

(65) Prior Publication Data

US 2018/0039582 A1 Feb. 8, 2018

(30) Foreign Application Priority Data

Aug. 2, 2016 (JP) .................................. 2016-152288

(51) Int. Cl.
| | |
|---|---|
| *H04L 29/06* | (2006.01) |
| *G06F 12/14* | (2006.01) |
| *H04L 9/32* | (2006.01) |
| *H04L 9/08* | (2006.01) |

(52) U.S. Cl.
CPC ........ *G06F 12/1408* (2013.01); *H04L 9/0897* (2013.01); *H04L 9/3234* (2013.01); *H04L 63/0428* (2013.01); *H04L 63/061* (2013.01); *G06F 2212/1052* (2013.01); *H04L 2209/127* (2013.01)

(58) Field of Classification Search
None
See application file for complete search history.

(56) References Cited

U.S. PATENT DOCUMENTS

| | | | | |
|---|---|---|---|---|
| 9,064,132 | B1 * | 6/2015 | Laird | G06F 21/6227 |
| 9,607,180 | B2 | 3/2017 | Sugano | |
| 2012/0054501 | A1 * | 3/2012 | Kato | H04L 9/0897 |
| | | | | 713/193 |
| 2015/0143506 | A1 * | 5/2015 | Sugano | G06F 21/85 |
| | | | | 726/17 |
| 2015/0358161 | A1 | 12/2015 | Kancharla et al. | |
| 2016/0065369 | A1 * | 3/2016 | Kakutani | H04L 9/0897 |
| | | | | 380/286 |
| 2016/0162418 | A1 * | 6/2016 | Yasukawa | G06F 12/1408 |
| | | | | 713/193 |
| 2017/0249467 | A1 * | 8/2017 | Mueller | H05K 999/99 |

FOREIGN PATENT DOCUMENTS

| | | |
|---|---|---|
| CN | 1702999 A | 11/2005 |
| CN | 102355351 A | 2/2012 |
| CN | 102769525 A | 11/2012 |
| CN | 103748827 A | 4/2014 |
| JP | 2015122720 A | 7/2015 |

OTHER PUBLICATIONS

JP2015122720B2 Koji et al. (Year: 2015).*
Office Action issued in Chinese patent application No. 201710651269.X dated Apr. 18, 2019. English translation provided.

* cited by examiner

*Primary Examiner* — Malcolm Cribbs
(74) *Attorney, Agent, or Firm* — Rossi, Kimms & McDowell LLP

(57) ABSTRACT

In an information processing apparatus having a hardware security module (HSM), an HSM function that makes it possible to encrypt and decrypt data using the encryption key of the HSM is able to be set to be enabled under the condition that the encryption key of the HSM is able to be backed up.

12 Claims, 11 Drawing Sheets

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium.

Description of the Related Art

Generally, in information processing apparatuses such as PCs (personal computers) and MFPs (multi-function peripheral/digital multi-function peripheral) having a printing function, confidential data is stored in an encrypted manner.

In recent years, some information processing apparatuses use an encryption key stored in an external hardware security module (HSM) physically connected thereto in the case of encrypting/decrypting the confidential data included in the information processing apparatuses. For example, this HSM uses a TPM (Trusted Platform Module) that complies with a TCG (Trusted Computing Group) standard. The TPM is a security chip having tamper resistance that makes it possible to safely manage the encryption key.

Generally, devices provided with a TPM realize safe management of confidential data by encrypting the confidential data and managing, within the TPM, the key that was used for the encryption. Hereinafter, such encryption/decryption using a TPM of an information processing apparatus is referred to as a "TPM function". In the case of adopting this TPM function, if the TPM malfunctions or is lost, for example, the TPM is replaced in some cases.

Now, for example, if a TPM is replaced with a new TPM due to malfunction, the TPM encryption key within the new TPM chip is different from the TPM encryption key within the old TPM before the malfunction. Therefore, confidential data in the information processing apparatus that was encrypted using the TPM encryption key within the old TPM cannot be decrypted by the new TPM and used. Therefore, the encryption key managed by the TPM (hereinafter, TPM encryption key) needs to be backed up. In most cases, backup of a TPM encryption key is performed by connecting an external storage such as a USB storage to the apparatus, and storing the TPM encryption key to the connected external storage. For example, if the TPM malfunctions, the TPM of the apparatus is replaced with a new TPM, an external storage in which the original TPM encryption key is stored is connected to the apparatus, and the TPM encryption key is restored to the new TPM using the TPM encryption key stored in the external storage.

A technique related to backup of a TPM encryption key of a device that uses a TPM function is described in Japanese Patent Laid-Open No. 2015-122720. According to this technique, the TPM encryption key is generated after the TPM function is enabled, and thus a user that uses the device executes backup of the TPM encryption key to an external storage such as a USB memory after enabling the TPM function.

However, there are cases where the user forgets to back up the TPM encryption key after enabling the TPM function of the device. This is conceivably because a USB memory for backup was not prepared when the TPM function was enabled, or the user who enables the TPM function and the user who backs up and manages the TPM encryption key are different, for example. It is also conceivable that a user who did not know that there was a backup function enabled the TPM function. If the TPM is replaced without the TPM encryption key being backed up in this manner, there is an issue that confidential data in the device that was encrypted using the TPM encryption key of the old TPM cannot be decrypted and used.

SUMMARY OF THE INVENTION

An aspect of the present invention is to eliminate the above-mentioned problem with conventional technology.

A feature of the present invention is to provide a technique for preventing the user from forgetting to back up an HSM encryption key.

According to a first aspect of the present invention, there is provided an information processing apparatus having a hardware security module (HSM), comprising: a memory device that stores a set of instructions; and at least one processor that executes the instructions to: back up an encryption key of the HSM; upon receiving an instruction to enable an HSM function that allows encryption and decryption of data using the encryption key of the HSM, set the HSM function to be enabled, and perform control to be able to receive the instruction to enable the HSM function under a condition that the encryption key of the HSM is able to be backed up in the backup.

According to a second aspect of the present invention, there is provided an information processing apparatus having a hardware security module (HSM), comprising: a memory device that stores a set of instructions; and at least one processor that executes the instructions to: back up an encryption key of the HSM; determine whether or not an HSM function that allows encryption and decryption of data using the encryption key of the HSM is enabled; determine whether or not the encryption key of the HSM has been backed up; and if it is determined that the HSM function is enabled, and that the encryption key of the HSM has not been backed up, perform control to back up the encryption key of the HSM.

According to a third aspect of the present invention, there is provided a method of controlling an information processing apparatus having a hardware security module (HSM), the method comprising: backing up an encryption key of the HSM; upon receiving an instruction to enable an HSM function that allows encryption and decryption of data using the encryption key of the HSM, setting the HSM function to be enabled; and performing control to be able to receive the instruction to enable the HSM function under a condition that the encryption key of the HSM is able to be backed up.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

In these embodiments, an external hardware security module (HSM) physically connected to an information processing apparatus is assumed to use a TPM (Trusted Platform Module). In this embodiment, an MFP (multi-function peripheral/digital multi-function peripheral) will be described as an example of an information processing apparatus that can connect to/use a TPM and has a user authentication function. However, the present invention is not limited to such a multi-function peripheral, and any information processing apparatus that can connect to/use an HSM such as a TPM and has a user authentication function can be adopted.

First Embodiment

Figure 1:
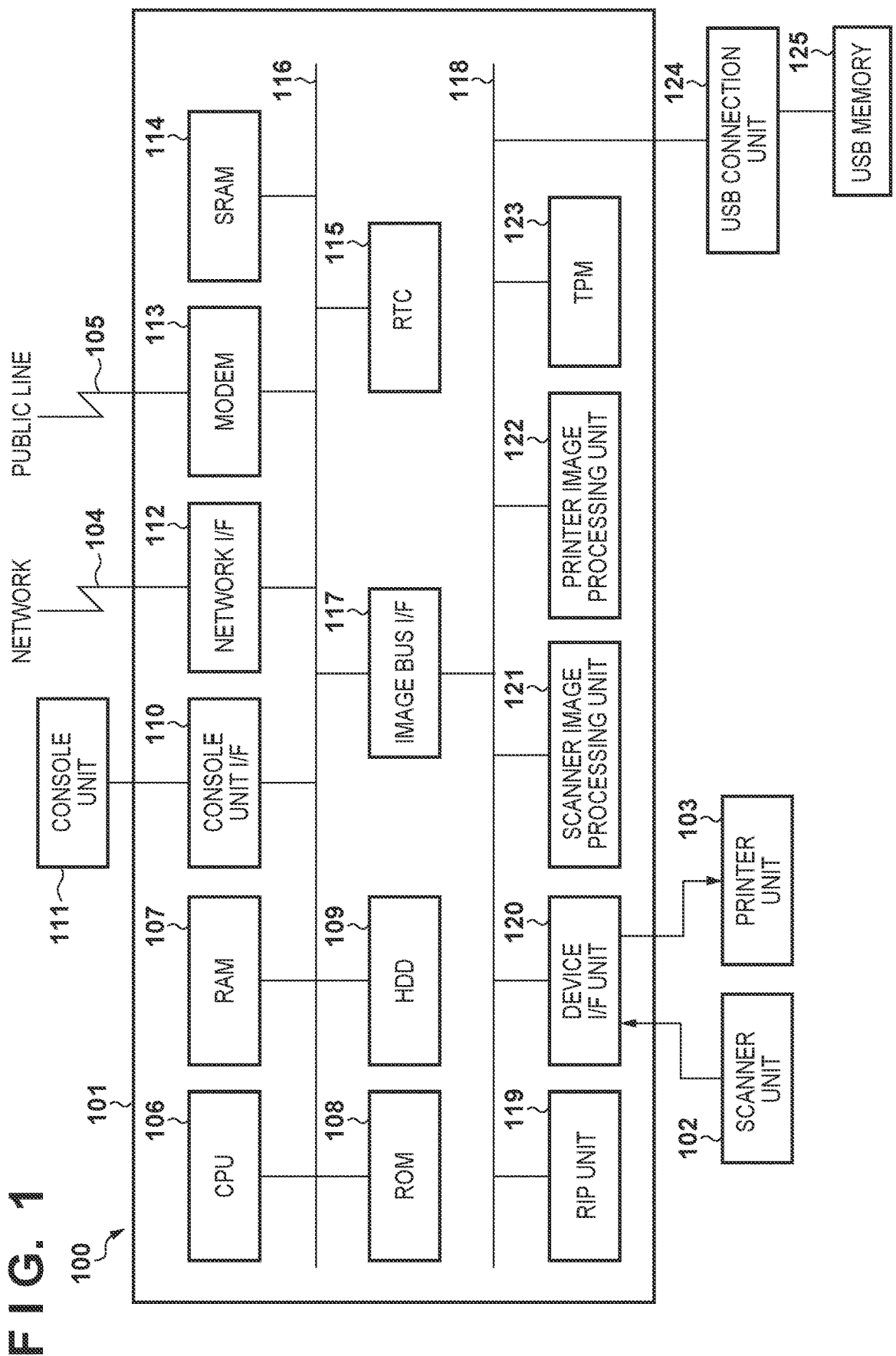
FIG. 1 is a block diagram for describing a schematic hardware configuration of a multi-function peripheral according to a first embodiment of the present invention.

FIG. 1 is a block diagram for describing a schematic hardware configuration of a multi-function peripheral 100 according to a first embodiment of the present invention.

A controlling unit 101 is connected to a scanner unit 102 that is an image input device and a printer unit 103 that is an image output device, and also performs input/output of image information and device information by connecting to a network 104 or a public line 105.

A CPU 106 is a processor that performs overall control of the multi-function peripheral 100. A RAM 107 is a memory that provides a system work memory for the CPU 106 to operate, and also temporarily stores image data, user information, a password and the like. A ROM 108 is a boot ROM, and stores a boot program. An HDD 109 is a hard disk drive, and stores programs executed by the CPU 106, applications, image data and the like. Also, programs for executing flowcharts according to the embodiments, which will be described later, are also stored in this HDD 109. The steps of the flowcharts according to the embodiments are achieved by the CPU 106 deploying a program stored in the HDD 109 into the RAM 107 and executing the program. However, a processor other than this CPU 106 may execute the steps of the flowcharts, or the CPU 106 and another processor may corporate to execute processing of the flowcharts.

A console unit interface 110 performs the roles of controlling an interface to a console unit 111 having a touch panel, outputting, to the console unit 111, image data to be displayed on the console unit 111, and transmitting, to the CPU 106, information that has been input by the user via the console unit 111. A network interface 112 is connected to the network 104, and performs input/output of information via the network 104. A modem 113 is connected to the public line 105, and performs input/output of information from/to another device via the public line 105. An SRAM 114 is a nonvolatile recording medium that can operate at a high speed. An RTC 115 is a real-time clock, and performs processing for continuously counting the present time even in a state where power is not supplied to the controlling unit 101. The above-described devices are arranged on a system bus 116.

An image bus I/F 117 is a bus bridge that connects the system bus 116 and an image bus 118 for transferring image data at a high speed, and that converts the data structure. The image bus 118 is constituted by a PCI bus or an IEEE 1394, and the below-described devices are arranged on this image bus 118. A RIP unit 119 is a raster image processor, and develops PDL code into a bitmap image. A device I/F unit 120 connects the scanner unit 102, the printer unit 103 and the controlling unit 101, and performs conversion between synchronous and asynchronous on image data. A scanner image processing unit 121 performs correction, processing and editing on image data that has been input from the scanner unit 102. A printer image processing unit 122 performs correction, resolution conversion and the like on image data that is to be output to the printer unit 103. A TPM 123 allows use of a TPM encryption key (a TPM function). A USB connection unit 124 connects to a USB memory 125 (external memory), and performs input/output of data from/to the USB memory 125.

Figure 2:
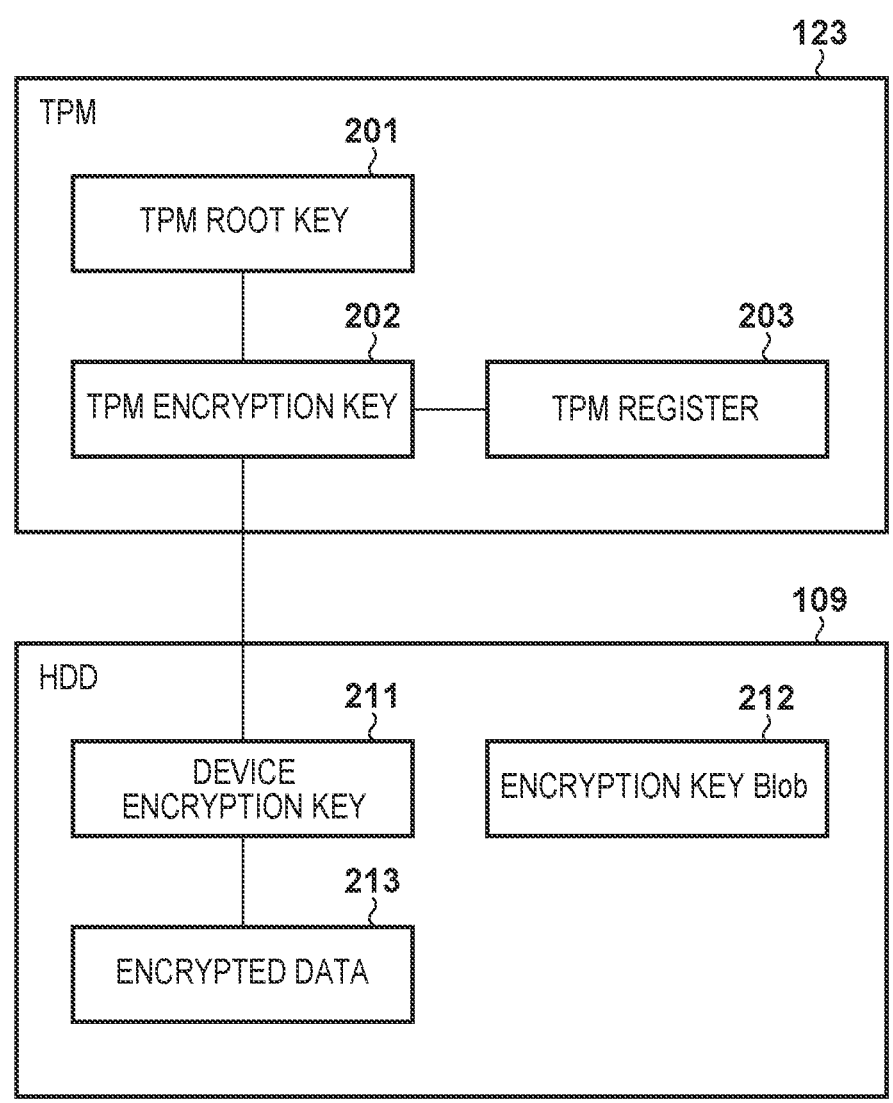
FIG. 2 is a block diagram for describing a schematic configuration of encryption keys and confidential data handled by a TPM and an HDD according to the first embodiment.

FIG. 2 is a block diagram for describing a schematic configuration of encryption keys and confidential data handled by the TPM 123 and the HDD 109 according to the first embodiment. The upper portion of FIG. 2 shows a schematic configuration of the TPM 123, which includes a TPM root key 201, a TPM encryption key 202 and a TPM register 203. Also, the lower portion of FIG. 2 shows a schematic configuration of data that is related to a TPM function and is stored in the HDD 109, and the data includes a device encryption key 211, a device encryption key blob 212 and encrypted data 213.

In the first embodiment, confidential data handled by the multi-function peripheral 100 is encrypted using the device encryption key 211. This confidential data includes not only personal data such as image data and an address book of the multi-function peripheral 100 but also individual encryption keys and certificates handled by application software of the multi-function peripheral 100, a password of a user authentication function, and the like, but there is no particular limitation.

The device encryption key 211 is encrypted using the TPM encryption key 202. Furthermore, this TPM encryption key 202 is encrypted using the TPM root key 201. It is assumed that this TPM root key 201 cannot be overwritten, deleted or taken out by an approach from the outside, and can only be used for encryption. This encryption key chain series makes it possible to realize robust security including tamper resistance. In addition, when the TPM 123 is connected to the multi-function peripheral 100 for the first time, such as at the time of factory shipment, the TPM encryption key 202 does not exist in the TPM 123. When the multi-function peripheral 100 is started for the first time, the CPU 106 generates an encryption key, and inputs the encryption key as a TPM encryption key to the TPM 123. In this manner, within the TPM 123, the TPM encryption key 202 is encrypted using the TPM root key 201, and is associated with the TPM root key 201. When the CPU 106 inputs the TPM encryption key 202 to the TPM 123, information is stored in the TPM register 203, and furthermore, the TPM 123 outputs an encryption key blob to the CPU 106. These items are used for verifying the validity of the TPM encryption key 202, and will be described in the description of processing in FIG. 3 to be described later.

Note that the configuration of these keys in the first embodiment is merely an example, and the present invention is not limited thereto. For example, a configuration may be adopted in which a TPM root key does not exist in the TPM, and only a TPM encryption key is stored, or a configuration may be adopted in which an encryption key within the TPM is protected more robustly using an encryption key other than a TPM root key and a TPM encryption key. A configuration may also be adopted in which confidential data in the HDD 109 is encrypted directly with a TPM encryption key, not with a device encryption key encrypted with a TPM encryption key.

Next, control for verifying the validity of the encryption key of the TPM 123 performed when the multi-function peripheral 100 according to the first embodiment is started will be described with reference to FIG. 1 to FIG. 3. Note that processing of the multi-function peripheral 100 of this embodiment is controlled by the CPU 106 within the multi-function peripheral 100.

Figure 3:
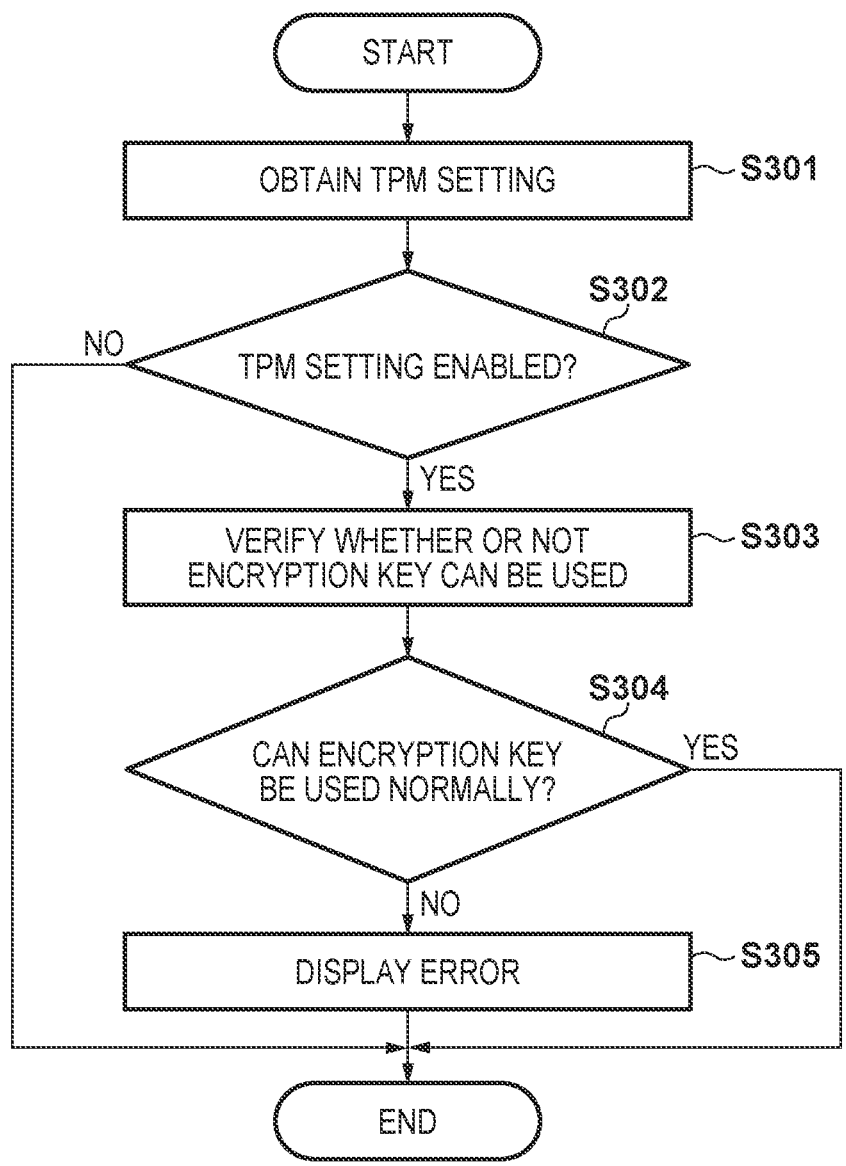
FIG. 3 is a flowchart for describing processing for starting the multi-function peripheral according to the first embodiment.

FIG. 3 is a flowchart for describing processing for starting the multi-function peripheral 100 according to the first embodiment. Note that this processing is achieved by the CPU 106 deploying a program stored in the HDD 109 into the RAM 107 and executing the program, for example.

First, in step S301, the CPU 106 obtains a TPM setting of the multi-function peripheral 100 from the SRAM 114. This TPM setting is setting information that indicates whether the TPM function of the multi-function peripheral 100 is enabled or disabled. Next, the procedure advances to step S302, where the CPU 106 determines whether or not the TPM setting obtained in step S301 is enabled. If the CPU 106 determines in step S302 that the TPM setting is disabled, this processing ends. On the other hand, if the CPU 106 determines in step S302 that the TPM setting is enabled, the procedure advances to step S303, where the CPU 106 verifies the validity of the encryption key.

In the first embodiment, the TPM encryption key 202 of the TPM 123 and the device encryption key 211 are set as validity verification targets. Verification of validity refers to checking whether or not the device encryption key 211 is obtained by decrypting the TPM encryption key 202 with the TPM root key 201, since the TPM encryption key 202 is a key obtained by encrypting the device encryption key 211 of the HDD 109 using the TPM root key 201. As described above, the TPM encryption key 202 of the TPM 123 is input by the CPU 106, and encrypted with the TPM root key 201. At this time, when the CPU 106 generates the TPM encryption key 202, and stores the TPM encryption key 202 to the TPM 123, the CPU 106 obtains the encryption key blob 212 from the TPM 123, and stores the encryption key blob 212 to the HDD 109. At this time, information associating this encryption key blob 212 with the TPM 123 is also stored in the TPM register 203 of the TPM 123. Therefore, in step S303, the CPU 106 inputs the encryption key blob 212 stored in the HDD 109 to the TPM 123. Accordingly, the TPM 123 compares the encryption key blob 212 that has been input with the association information stored in the TPM register 203. If these match, it is confirmed that the TPM encryption key 202 of the TPM 123 and the device encryption key 211 stored in the HDD 109 are associated with each other.

Note that this processing for checking the validity of the encryption key is merely an example, and there is no limitation to this processing. For example, a copy of a device encryption key may be held in the TPM register 203, and the CPU 106 may input the device encryption key 211 to the TPM 123, and compare the device encryption key 211 with the device encryption key held in the TPM register 203. It may be checked in this manner whether or not the device encryption key 211 of the HDD 109 and the TPM encryption key 202 of the TPM 123 are associated with each other.

After the processing in step S303, the procedure advances to step S304, where the CPU 106 determines, by verifying the validity of the encryption key, whether or not the encryption key handled by the CPU 106 can be used normally. If the CPU 106 determines in step S304, by verifying the validity of the encryption key, that the encryption key can be used normally, this processing ends. On the other hand, if the CPU 106 determines in step S304, by verifying the validity of the encryption key, that the encryption key to be handled cannot be used normally, the procedure advances to step S305, where the CPU 106 displays an error screen (not illustrated here) on the console unit 111, and ends this processing.

The above-described processing is processing for verifying the validity of the TPM encryption key at the time of starting the multi-function peripheral 100. At this time, an example of a case where the encryption key cannot be used normally as in step S305 is a case such as where due to malfunction of the TPM chip or malfunction of the main board to which the TPM chip is connected or in which the TPM chip is included, the chip/main board is replaced, and the multi-function peripheral 100 is then started.

Next, control for enabling the TPM function according to the first embodiment will be described with reference to FIGS. 1, 4 and 5.

Figure 4:
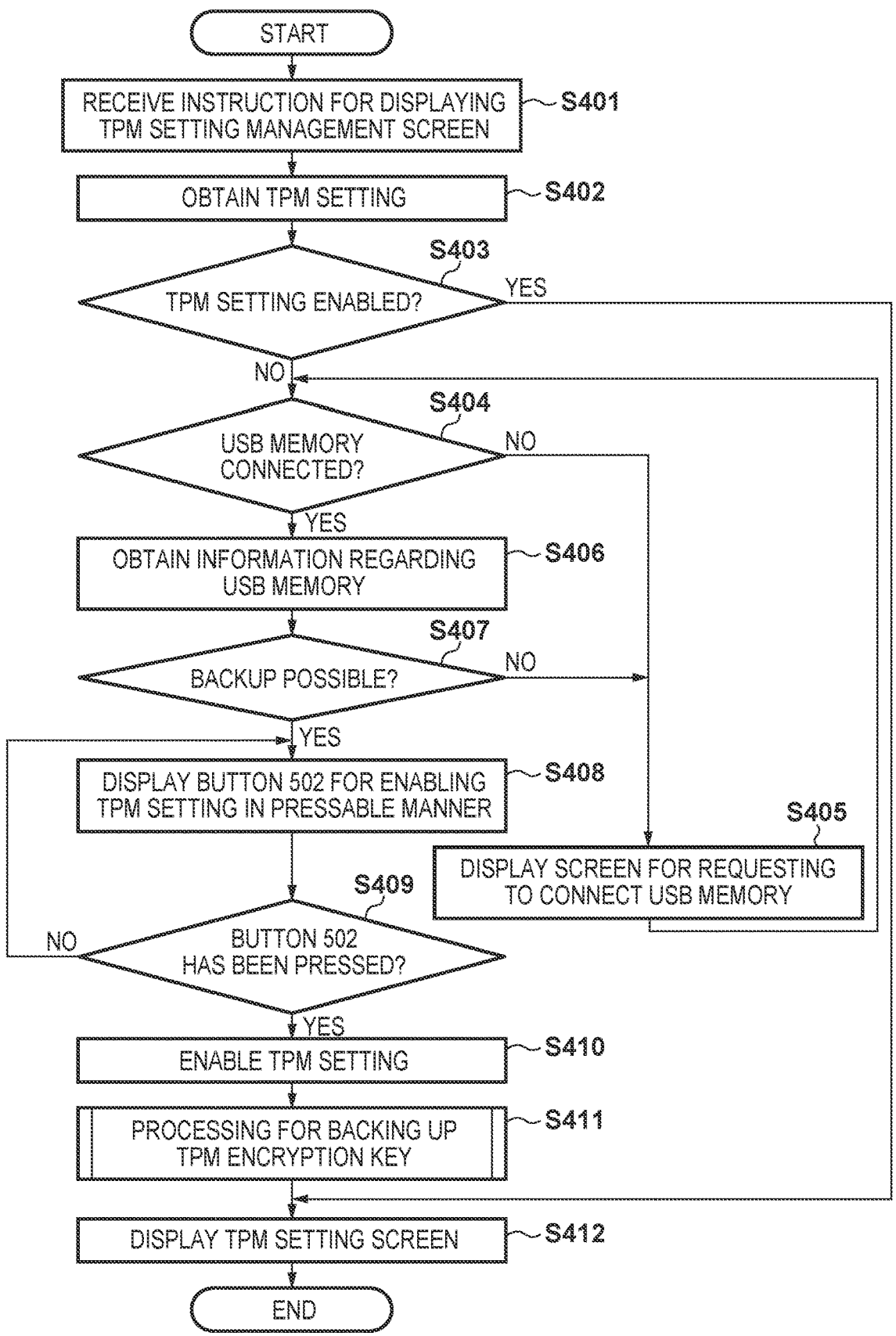
FIG. 4 is a flowchart for describing processing for enabling a TPM function in the multi-function peripheral according to the first embodiment.

FIG. 4 is a flowchart for describing processing for enabling the TPM function in the multi-function peripheral 100 according to the first embodiment. Note that this processing is achieved by the CPU 106 deploying a program stored in the HDD 109 into the RAM 107 and executing the program, for example.

First, in step S401, the CPU 106 receives an instruction for displaying the TPM setting management screen (FIGS. 5A to 5C) from the console unit 111. Next, the procedure advances to step S402, and the CPU 106 obtains the TPM setting stored in the SRAM 114. Next, the procedure advances to step S403, and the CPU 106 determines whether or not the obtained TPM setting is set to be enabled. If it is determined that the TPM setting is enabled, the procedure advances to step S412, but otherwise, the procedure advances to step S404, where the CPU 106 determines whether or not the USB memory 125 is connected to the USB connection unit 124. If the CPU 106 determines in step S404 that the USB memory 125 is not connected to the USB connection unit 124, the procedure advances to step S405. In step S405, the CPU 106 displays, on the console unit 111, a message for requesting the user to connect the USB memory 125 to the USB connection unit 124, and the procedure advances to step S404.

Figure 5A:
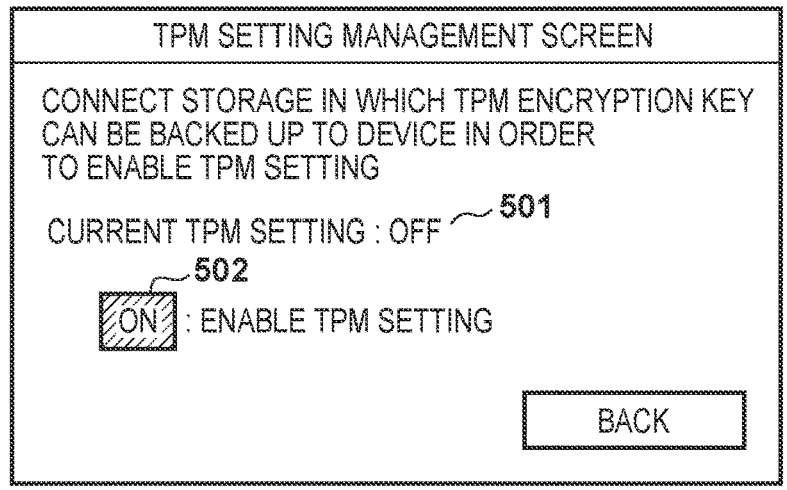
FIGS. 5A to 5C depict views showing examples of a TPM setting management screen displayed on a console unit of the multi-function peripheral according to the first embodiment.

FIG. 5A depicts a view showing an example of the TPM setting management screen displayed on the console unit 111 of the multi-function peripheral 100 according to the first embodiment.

Here, an example is illustrated in which the message requesting the user to connect, to the USB connection unit 124, the USB memory 125 in which the TPM encryption key can be backed up is displayed in order to enable TMP setting. This screen includes an item 501 of the current TPM setting and a button 502 for enabling TPM setting. In FIG. 5A in the state of step S405, the USB memory 125 is not connected, and thus the button 502 for enabling TPM setting is displayed in a grayed out manner such that the button 502 cannot be pressed.

If the CPU 106 determines in step S404 that the USB memory 125 is connected to the USB connection unit 124, the procedure advances to step S406, where the CPU 106 obtains information regarding the USB memory 125, and the procedure advances to step S407. In step S407, the CPU 106 determines whether or not the TPM encryption key can be backed up in a storage area of the USB memory 125. If it is determined in step S407 that the TPM encryption key cannot be backed up, the procedure advances to step S405. Here, the state where the TPM encryption key cannot be backed up refers to a case where the TPM encryption key cannot be written to the USB memory 125, for example, when there is no free storage area in the USB memory 125 or the user has no authority that allows writing to the storage area.

Note that, in the first embodiment, the backup destination of the TPM encryption key is assumed to be a USB memory, but the backup destination may be a storage other than the USB memory, and is not particularly limited. For example, memory media such as a USB-HDD and an SD card, an SMB through a network, a cloud storage area or the like may be used.

Figure 5B:
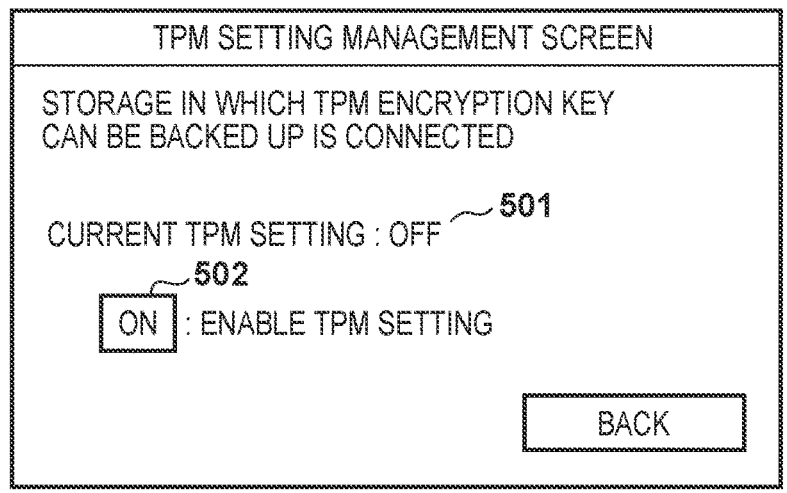

On the other hand, if the CPU 106 determines in step S407 that the TPM encryption key can be backed up in the storage area of the USB memory 125, the procedure advances to step S408, where the CPU 106 displays the above-described button 502 for enabling TPM setting of the TPM setting management screen so as to be pressable. FIG. 5B shows a view illustrating an example in which, on the TPM setting management screen, the grayed out state of the button 502 for enabling TPM setting is released, and the button 502 is displayed so as to be pressable.

Next, the procedure advances to step S409, where the CPU 106 determines whether or not the button 502 for enabling TPM setting has been pressed. If the CPU 106 determines in step S409 that the button 502 has been pressed, the procedure advances to step S410, where the CPU 106 enables the TPM setting. After that, in step S411, the CPU 106 executes processing for backing up the TPM encryption key.

In the first embodiment, when the TPM setting is enabled, the CPU 106 outputs an instruction to generate a TPM encryption key to the TPM 123. Accordingly, the TPM 123 generates a TPM encryption key, and outputs the encryption key blob 212 to the CPU 106. Setting information indicating that setting of the TPM function is enabled is stored in the SRAM 114 by the CPU 106.

When the user enables the TPM function in these steps S404 to S411, processing for generating a TPM encryption key is executed under the condition that the TPM encryption key can be backed up in advance. This has an effect of preventing the user from forgetting to back up the TPM encryption key.

Next, processing for backing up the TPM encryption key in step S411 will be described with reference to FIGS. 1, 6 and 7.

Figure 6:
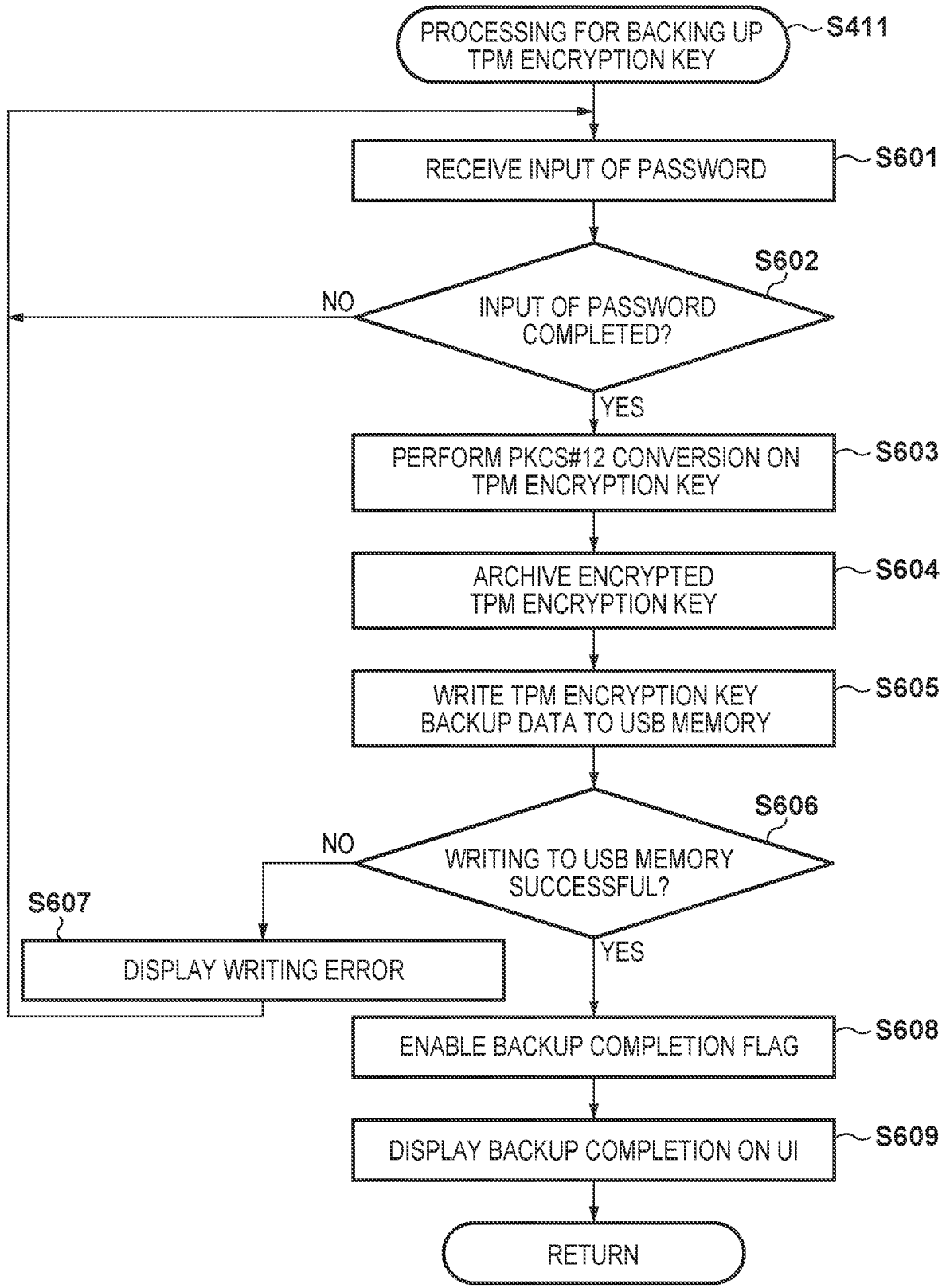
FIG. 6 is a flowchart for describing processing for backing up a TPM encryption key in step S411 in FIG. 4 performed by the multi-function peripheral according to the first embodiment.

FIG. 6 is a flowchart for describing processing for backing up the TPM encryption key of step S411 in FIG. 4 performed by the multi-function peripheral 100 according to the first embodiment.

In step S601, the CPU 106 displays, on the console unit 111, a screen for inputting a password for backing up the TPM encryption key, and receives input of the password at the time of backing up the TPM encryption key.

Figure 7:
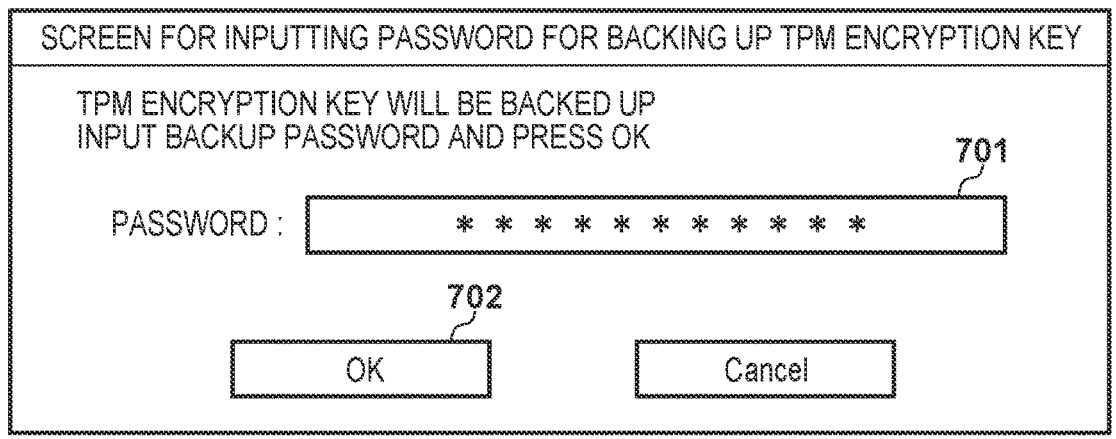
FIG. 7 depicts a view showing an example of a screen for inputting a password for backing up a TPM encryption key displayed on the console unit of the multi-function peripheral according to the first embodiment.

FIG. 7 depicts a view showing an example of the screen for inputting a password for backing up the TPM encryption key, the screen being displayed on the console unit 111 of the multi-function peripheral 100 according to the first embodiment.

The password that has been input from the console unit 111 is displayed in a password input frame 701 so as to be masked with "*". Here, when the user presses an OK button 702, the CPU 106 receives the password for backing up the TPM encryption key and an instruction to execute backup of the TPM encryption key. In the first embodiment, this password information is held in the SRAM 114 by the CPU 106. In addition, in the first embodiment, the same password is assumed to be input twice in order to prevent erroneous setting.

If the CPU 106 determines in step S602 that input of the password is complete in this manner, the procedure advances to step S603, where the CPU 106 encrypts the TPM encryption key based on the password held in the SRAM 114, and the procedure advances to step S604. Encryption using a password in the first embodiment is assumed to be performed in a PKCS #12 (public Key Cryptography Standard #12) format. Note that, in the first embodiment, backup of the TPM encryption key is performed by a password encryption method that is based on password information designated by the user, but the present invention is not limited thereto. For example, the TPM encryption key may be protected with a fixed password held in the multi-function peripheral 100 in advance, a common key, or a public key and a secret key using a PKI mechanism.

Next, the procedure advances to step S604, where the CPU 106 forms the encrypted TPM encryption key into an output file format and archives the file in order to back up the encrypted TPM encryption key, and the procedure advances to step S605. In the first embodiment, before performing restoration of the TPM encryption key, which will be described later, the file to be output is archived with an identification header added thereto in order to be identified as the file of the encrypted TPM encryption key. In the first embodiment, this data is referred to as TPM encryption key backup data.

In step S605, the CPU 106 writes the archived TPM encryption key backup data to the USB memory 125. Next, the procedure advances to step S606, where the CPU 106 determines whether or not the TPM encryption key backup data could be normally written to the USB memory 125, and if it is determined that writing to the USB memory 125 failed, the procedure advances to step S607. In step S607, the CPU 106 displays a writing error on the console unit 111, and the procedure advances to step S601, where backup processing is repeated.

On the other hand, if it is determined in step S606 that backup to the USB memory 125 was successful, the procedure advances to step S608, where the CPU 106 stores a backup completion flag to the SRAM 114, and the procedure advances to step S609. In step S609, the CPU 106 displays, on the console unit 111, a message indicating that backup of the TPM encryption key is complete, and ends this processing for backing up the TPM encryption key.

Note that, in the first embodiment, it is assumed that when the button 502 for enabling TPM setting is pressed, the screen automatically switches to a screen for inputting a password for backing up the TPM encryption key in FIG. 7. However, a configuration may be adopted in which the screen transitions according to a user instruction, and backup is performed, without the screen transitioning automatically.

Next, the description will now return to FIG. 4.

When backup of the TPM encryption key is complete in this manner, the procedure advances to step S412 in FIG. 4, and the CPU 106 displays, on the console unit 111, a message indicating that the TPM setting is enabled.

Figure 5C:
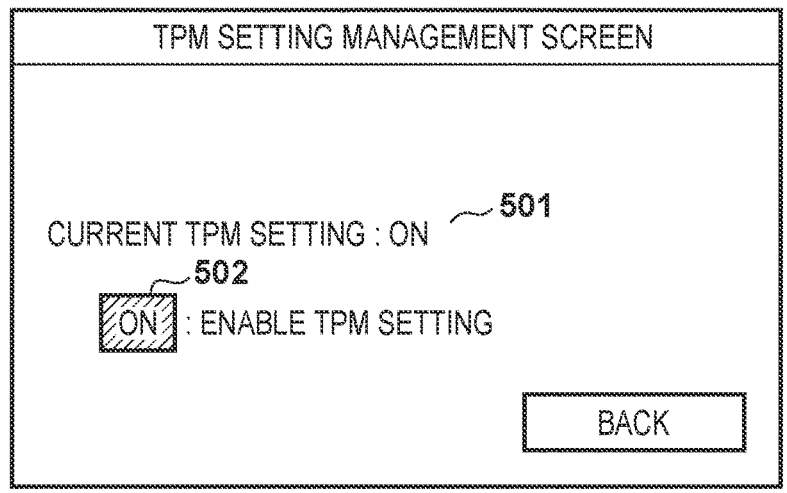

FIG. 5C depicts a view showing an example of the TPM setting screen when the TPM setting is enabled.

FIG. 5C shows an example in which the current TPM setting item 501 is changed to "ON", and the button 502 for enabling TPM setting is displayed in a grayed out manner so as to not be pressable.

Note that it is envisioned that only a user that has administrative authority can enable the TPM setting and backup the TPM encryption key according to the first embodiment. Therefore, the TPM setting management screens shown in FIGS. 5A to 5C are displayed only when the user that has administrative authority logs in.

As described above, according to the first embodiment, in the information processing apparatus that has a TPM function, the user can change the TPM setting from a disabled state to an enabled state under the condition that the TPM encryption key can be backed up. This can prevent the user from forgetting to back up the TPM encryption key after enabling TPM setting.

Second Embodiment

Next, a second embodiment of the present invention will be described. In the first embodiment above, it is assumed that a user performs an operation via the console unit 111 when enabling the TPM setting of the multi-function peripheral 100. However, instead of the TPM setting only being enabled by such setting from a local UI, there are also cases where the TPM setting is enabled remotely. One example is the case where an administrator setting including the TPM setting of the multi-function peripheral 100 is imported as data via a network. In such a case, given that the instruction is given remotely, it is not realistic to make it impossible to enable the TPM function unless a storage such as a USB memory is connected as in the first embodiment. On the other hand, if a configuration is adopted in which the TPM setting can be enabled remotely even when a storage is not connected, there is a possibility that a situation occurs where the TPM encryption key is not backed up.

In view of this, in the second embodiment, when an instruction to enable TPM setting is received from a remote apparatus via a network, enabling the TPM setting is permitted even if a storage is not connected. The user is prompted to back up the TPM encryption key at the time of starting a multi-function peripheral 100 in which the TPM setting was enabled in the state where the TPM encryption key is not backed up, or at the time of user authentication in the multi-function peripheral 100 in such a state, and thereby the user is prevented from forgetting to back up the TPM encryption key. Note that, regarding the configuration of the multi-function peripheral 100 and a TPM 123, TPM encryption key backup processing and the like according to the second embodiment, portions that are not described in the second embodiment are the same as those in the first embodiment. Processing in the case where the TPM setting is enabled upon receiving an instruction to enable the TPM setting from a remote apparatus will be described below. In the second embodiment as well, when the user attempts to enable the TPM setting from a console unit 111 of the multi-function peripheral 100, the multi-function peripheral 100 executes the processing in the first embodiment.

Figure 8:
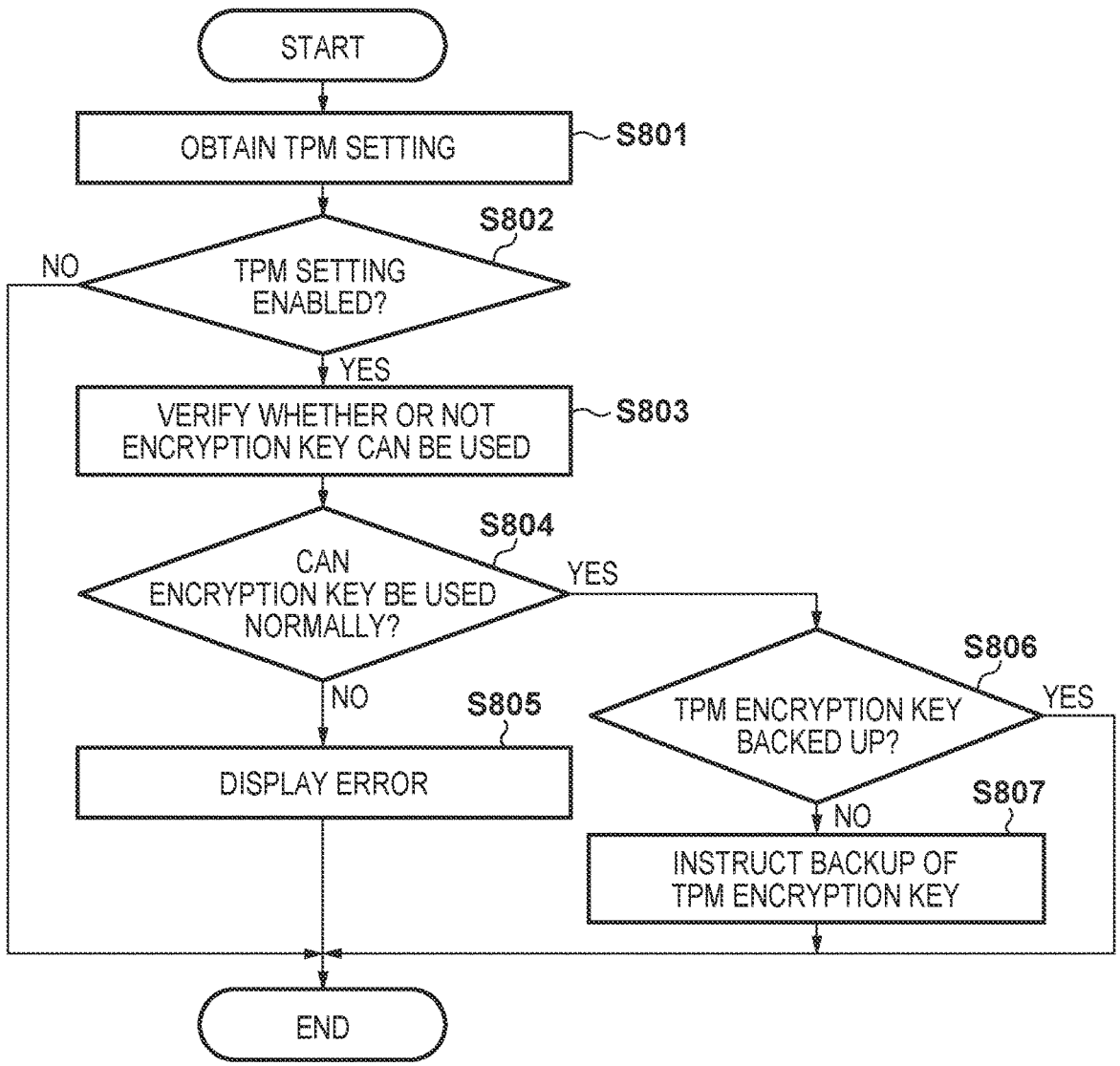
FIG. 8 is a flowchart for describing processing for starting a multi-function peripheral according to a second embodiment.

FIG. 8 is a flowchart for describing processing for starting the multi-function peripheral 100 according to the second embodiment. Note that this processing is achieved by a CPU 106 deploying a program stored in an HDD 109 into a RAM 107 and executing the program, for example. This processing in FIG. 8 is different from the flowchart in FIG. 3 according to the above first embodiment in that processing of steps S806 and S807 is added. This additional processing is processing for displaying a backup instruction if the TPM encryption key has not been backed up, but detailed description thereof will be given later. The processing of steps S801 to S805 in the flowchart in FIG. 8 according to the second embodiment is similar to the processing of steps S301 to S305 in FIG. 3 in the first embodiment, and thus description thereof is omitted.

If the CPU 106 determines in step S804, by verifying the validity of the encryption key, that the encryption key handled by the CPU 106 can be used normally, the procedure advances to step S806. In step S806, the CPU 106 refers to a backup completion flag stored in an SRAM 114, and determines whether or not the TPM encryption key has been backed up. This backup completion flag is information stored in the SRAM 114 by the CPU 106 in the above-described step S608 of the first embodiment. If, in this manner, the CPU 106 determines in step S806 that the TPM encryption key has been backed up, this processing ends. On the other hand, if the CPU 106 determines in step S806 that the TPM encryption key has not been backed up, the procedure advances to step S807, where the CPU 106 displays, on the console unit 111, a screen for instructing backup of the TPM encryption key, and ends this processing.

Figure 9:
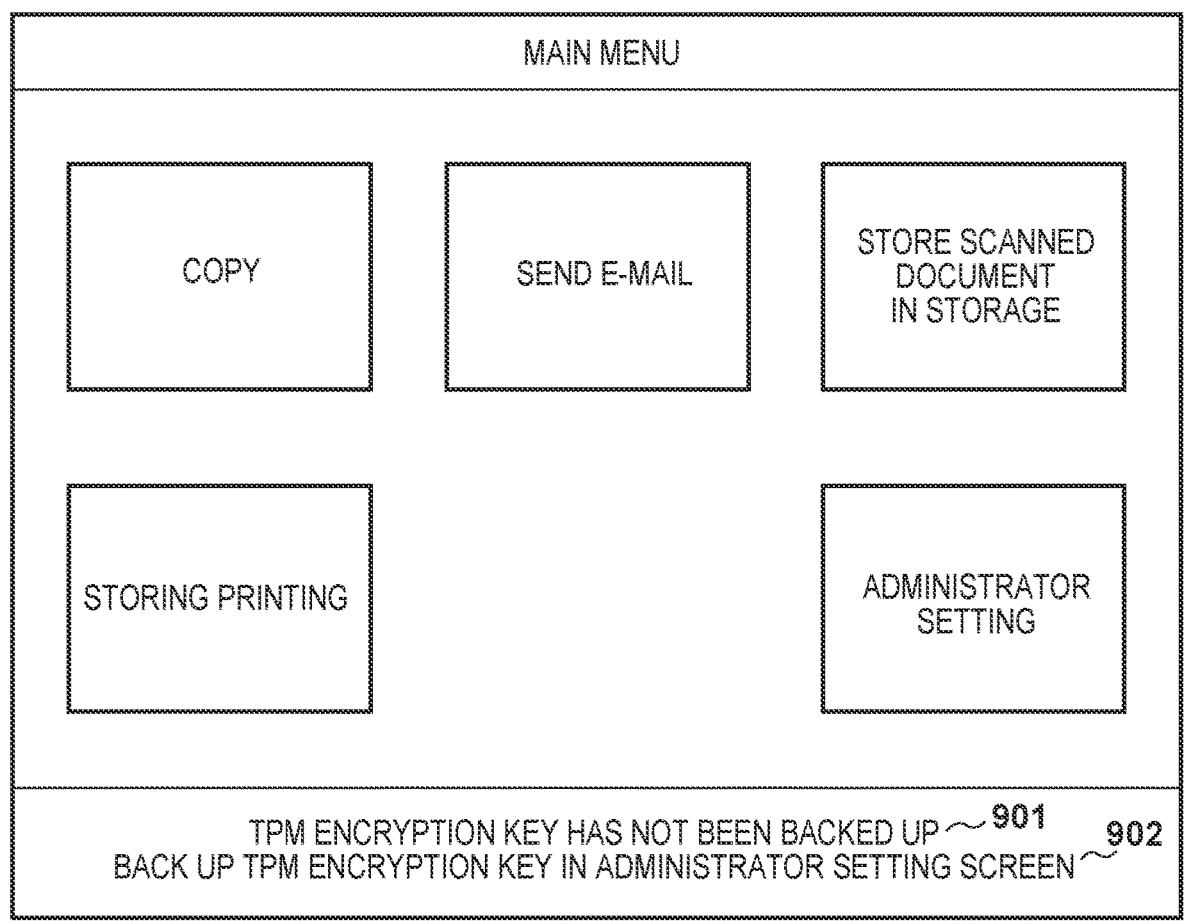
FIG. 9 depicts a view showing an example of a main menu screen of functions provided by the multi-function peripheral according to the second embodiment

FIG. 9 depicts a view showing an example of a main menu screen of functions provided by the multi-function peripheral 100 according to the second embodiment. This screen is displayed on the console unit 111 by the CPU 106 when the multi-function peripheral 100 is started. In the second embodiment, a backup instruction message 902 is displayed in the region of a status line 901 of this main menu screen, and a screen prompting the user to back up the TPM encryption key is displayed.

Accordingly, the user of the multi-function peripheral 100 notices that the TPM encryption key has not been backed up, and can take an appropriate measure.

Next, control in the case where an administrator performs user authentication with the multi-function peripheral 100 will be described.

Figure 10:
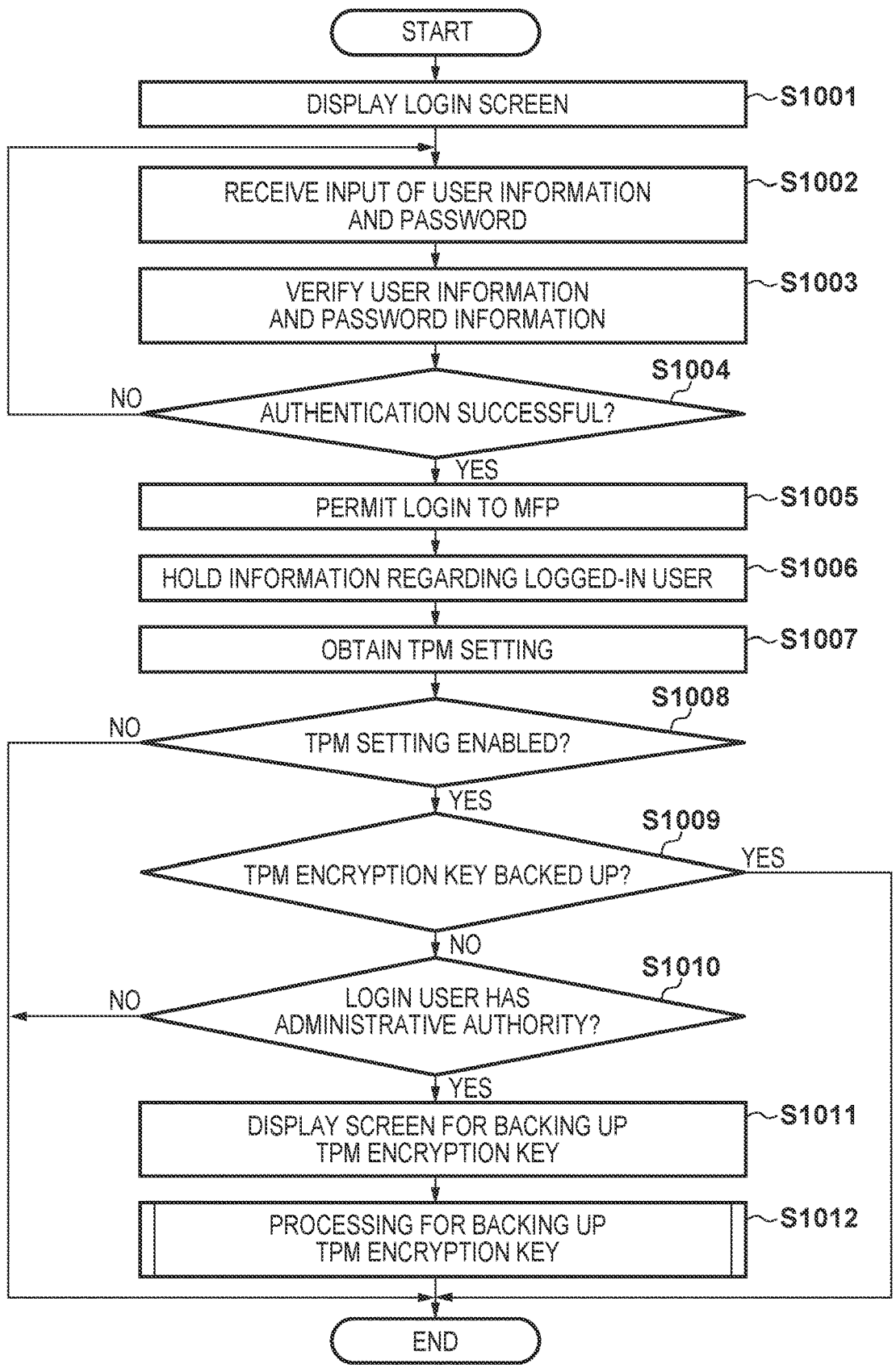
FIG. 10 is a flowchart for describing user authentication processing performed by the multi-function peripheral according to the second embodiment.

FIG. 10 is a flowchart for describing user authentication processing performed by the multi-function peripheral 100 according to the second embodiment. Note that this processing is achieved by the CPU 106 deploying a program stored in the HDD 109 into the RAM 107 and executing the program, for example.

First, in step S1001, the CPU 106 causes the console unit 111 to display a login screen, and the procedure advances to step S1002. In step S1002, the CPU 106 receives input of user information and a password from the user via the console unit 111. The user information and password that have been input in this manner are held in the RAM 107. In the second embodiment, the RAM 107 is used for temporarily storing the user information and password, but another apparatus that can store data such as the HDD 109 may be used, and there is no limitation. A third embodiment described later is similarly not limited in this way either. In addition, in the second embodiment, the CPU 106 encrypts a password associated with user information for the user authentication, using a device encryption key 211, and stores the password in the HDD 109.

Next, the procedure advances to step S1003, where the CPU 106 obtains, from the HDD 109, the password information encrypted in association with the user information that has been input, decrypts the password information, compares the password information with the password that has been input, and verifies whether or not the password is a correct password, and the procedure transitions step S1004. In the second embodiment, such decryption of the encrypted password by the CPU 106 is performed using the device encryption key 211. In addition, the device encryption key 211 is encrypted using a TPM encryption key 202 of the TPM 123. The CPU 106 obtains and uses a device encryption key decrypted with a TPM encryption key 202 by inputting the encrypted device encryption key 211 to the TPM 123. Furthermore, this TPM encryption key 202 has been encrypted with a TPM root key 201, and when the TPM encryption key 202 is used, the TPM encryption key 202 is decrypted using the TPM root key 201.

If the CPU 106 performs authentication, in step S1004, on the user with use of the user information and password that have been input in step S1002 and the authentication fails as a result, an error is displayed on the console unit 111, and the procedure transitions to step S1002. On the other hand, if the CPU 106 determines in step S1004 that the user information and the password that have been input are correct and the user authentication is successful, the procedure advances to step S1005, where the CPU 106 permits the user to log in the multi-function peripheral 100. Next, the procedure advances to step S1006, where the CPU 106 causes the RAM 107 to hold the user information of the user that has logged in, and advances the procedure to step S1007. In step S1007, the CPU 106 obtains the TPM setting from the SRAM 114, and the procedure transitions to step S1008.

In step S1008, the CPU 106 determines whether or not the TPM setting obtained from the SRAM 114 is set to be enabled. Here, if the CPU 106 determines that the TPM setting is disabled, this processing ends. On the other hand, if the CPU 106 determines in step S1008 that the TPM setting is set to be enabled, the procedure advances to step S1009, where the CPU 106 determines whether or not the TPM encryption key has been backed up from the SRAM 114. At this time, as described in the first embodiment, it is determined whether or not the TPM encryption key has been backed up, according to whether or not the backup completion flag stored in the SRAM 114 is on. Here, if it is determined that the TPM encryption key has been backed up, this processing ends. On the other hand, if the CPU 106 determines in step S1009 that the TPM encryption key has not been backed up, the procedure advances to step S1010, where the CPU 106 determines whether or not the user that has logged in has administrative authority. Here, if it is determined that the user has administrative authority, the procedure advances to step S1011, where the CPU 106 causes a screen for prompting the user to back up the TPM encryption key to be displayed. In the second embodiment, the above-described screen for inputting a password for backing up the TPM encryption key in FIG. 7 is displayed on the console unit 111. The processing for backing up the TPM encryption key after that is similar to the above-described processing in the first embodiment. In step S1012, similarly to the above-described flowchart in FIG. 6, the CPU 106 executes the processing for backing up the TPM encryption key, and ends this processing.

This processing makes it possible to, in the case where the user that has logged in is an administrator, and the TPM encryption key has not been backed up, prevent the user from forgetting to back up the TPM encryption key by prompting the user to back up the TPM encryption key. Note that, in the second embodiment, a screen for prompting backup is displayed on the console unit 111 immediately after the user is authenticated, but the present invention is not limited thereto. For example, a configuration may be adopted in which, when the user changes a management setting of the multi-function peripheral 100, such a screen is displayed when the display of the console unit 111 transitions to a management screen.

If the CPU 106 determines in step S1010 that the user that has logged in does not have administrative authority, this processing is ended. In the second embodiment, this is because it is envisioned that backup of the TPM encryption key is executed only by a user that has administrative authority.

Note that, in the second embodiment, other functions provided by the multi-function peripheral 100 such as a copy function can be executed even if the TPM encryption key is not backed up. However, a specification may be adopted in which, if the TPM encryption key is not backed up, a button provided in the main menu screen in FIG. 9 such as a copy button cannot be operated such that a predetermined function is not allowed to be executed, and there is no particular limitation.

As described above, according to the second embodiment, when the multi-function peripheral 100 in which the TPM setting is enabled in the state where the TPM encryption key has not been backed up is started, or a user is authenticated in such a state, the user is prompted to back up the TPM encryption key. This makes it possible to prevent the user from forgetting to back up the TPM encryption key in the case where the user enables the TPM setting remotely, for example, unlike the first embodiment.

Third Embodiment

Next, a third embodiment of the present invention will be described. In the above first and second embodiments, in the multi-function peripheral 100 that has a TPM function, a TPM encryption key is generated after TPM setting is enabled, and thus backup can also be performed only after the TPM setting is enabled. However, there can be some other HSMs (Hardware Security Modules) in which an encryption key (hereinafter, HSM encryption key) is generated before a function (hereinafter, HSM function) is enabled. In view of this, in the third embodiment, control for preventing a user from forgetting to back up an HSM encryption key, in a multi-function peripheral 100 in which the HSM encryption key can be generated/backed up before the HSM function is enabled will be described. In the third embodiment, differences from the above first and second embodiments will be described below.

Figure 11:
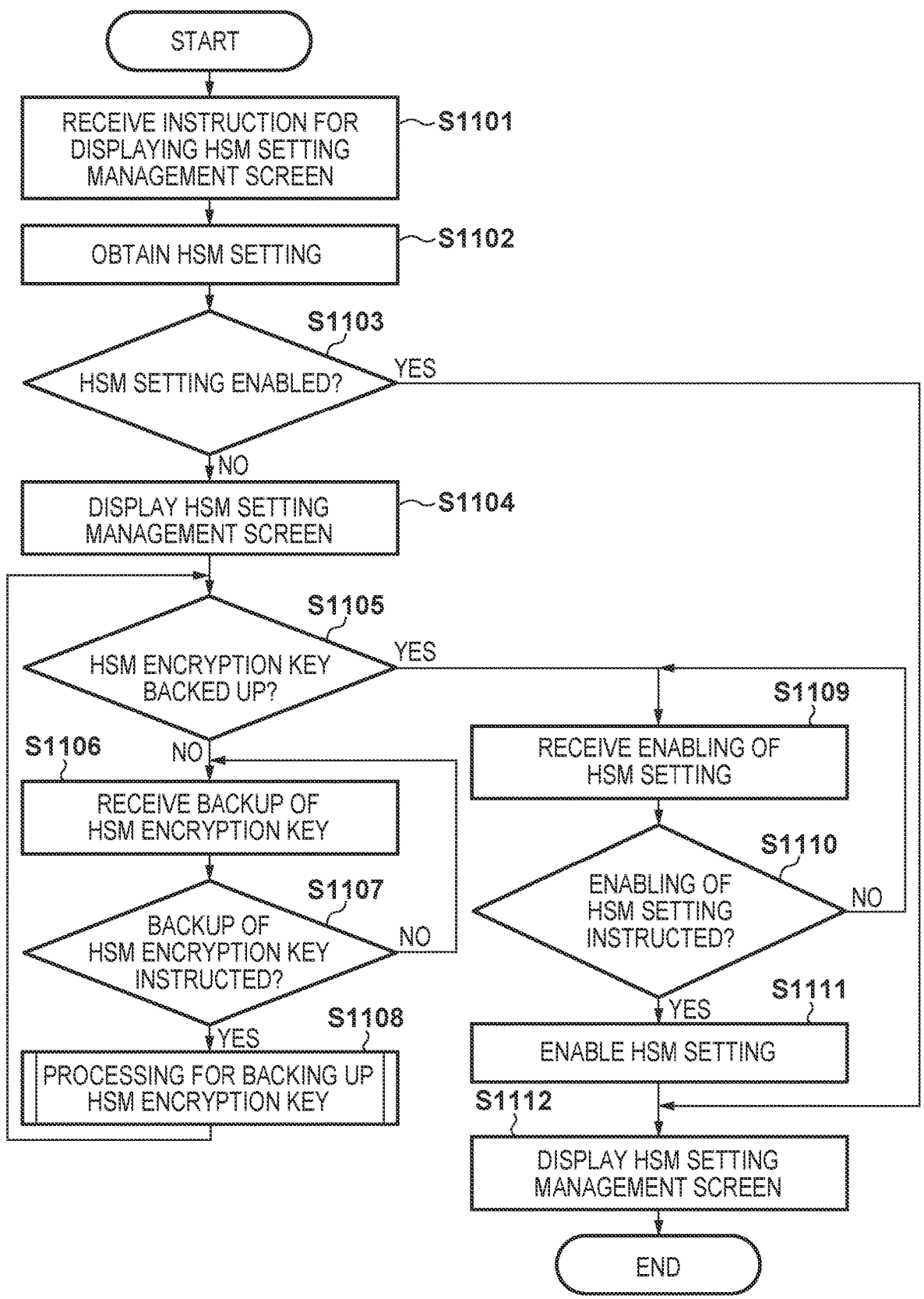
FIG. 11 is a flowchart for describing processing for enabling an HSM function and backup processing that are performed by a multi-function peripheral according to a third embodiment of the present invention.

FIG. 11 is a flowchart for describing processing for enabling the HSM function and backup processing that are performed by the multi-function peripheral 100 according to the third embodiment of the present invention. Note that this processing is achieved by a CPU 106 deploying a program stored in an HDD 109 into a RAM 107 and executing the program, for example.

First, in step S1101, the CPU 106 receives an instruction for displaying an HSM setting management screen from a console unit 111. Next, the procedure advances to step S1102, where the CPU 106 obtains an HSM setting from an SRAM 114. Next, in step S1103, the CPU 106 determines whether or not the HSM setting obtained from the SRAM 114 is enabled. If the CPU 106 determines in step S1103 that the obtained HSM setting is disabled, the procedure advances to step S1104, where the CPU 106 displays, on the console unit 111, a message requesting the user to back up the HSM encryption key in advance, and the procedure advances to step S1105.

In step S1105, the CPU 106 determines whether or not the HSM encryption key has been backed up. Also in this case, similarly to the above-described step S806, it is determined whether or not the HSM encryption key has been backed up, according to whether or not a backup completion flag stored in the SRAM 114 is on. Here, if it is determined that the HSM encryption key has not been backed up, the procedure advances to step S1106, where the CPU 106 receives backup of the HSM encryption key, and the procedure advances to step S1107.

Figure 12A:
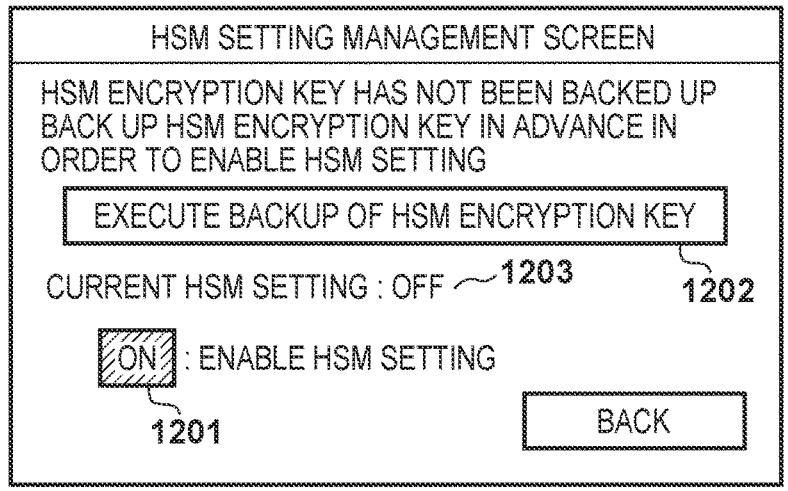
FIGS. 12A to 12C depict views showing examples of an HSM setting management screen displayed on a console unit of the multi-function peripheral according to the third embodiment.

FIG. 12A depicts a view showing an example of the HSM setting management screen displayed on the console unit 111 of the multi-function peripheral 100, in step S1106 in FIG. 11. Here, the message requesting the user to back up the HSM encryption key in advance is displayed, and the current HSM setting 1203 is off. Here, as shown in FIG. 12A, a button 1202 for instructing execution of backup of the HSM encryption key is displayed in an operable manner, and a button 1201 for enabling HSM setting is displayed in a grayed out manner so as not to be operable.

In step S1107, the CPU 106 determines whether or not execution of backup of the HSM encryption key has been instructed by operating the button 1202, and if it is determined that execution of backup of the HSM encryption key has been instructed, the procedure advances to step S1108, and processing for backing up the HSM encryption key is carried out. In this processing for backing up the HSM encryption key, backup of a TPM encryption key is merely replaced by backup of an HSM encryption key, and this processing is basically similar to the above-described step S411 of the first embodiment.

On the other hand, if the CPU 106 determines in step S1105 that the HSM encryption key has been backed up, the procedure advances to step S1109, where the CPU 106 receives the instruction to enable the HSM setting, and the procedure advances to step S1110.

Figure 12B:
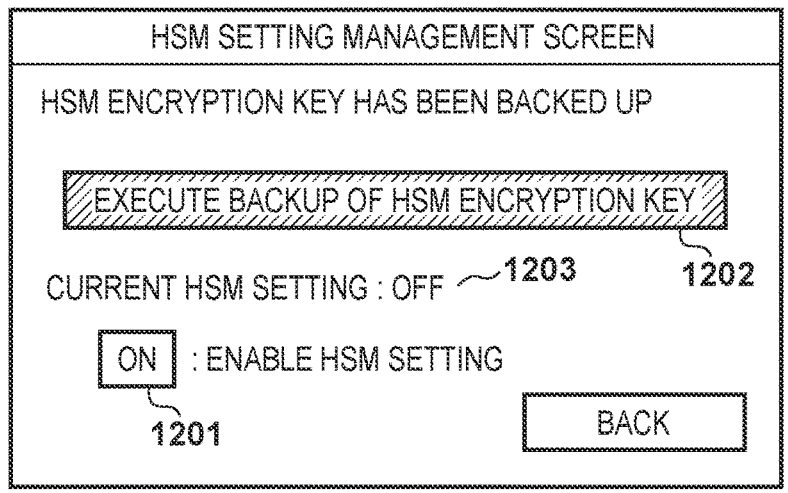

FIG. 12B depicts a view showing an example of the HSM setting management screen displayed on the console unit 111 of the multi-function peripheral 100 in step S1109 in FIG. 11.

Here, the HSM encryption key has been backed up, and thus the grayed out state of the button 1201 for enabling HSM setting is released such that the button 1201 can be pressed. In addition, in FIG. 12B, the button 1202 for instructing execution of backup of the HSM encryption key is displayed in a grayed out manner so as not to be operable.

In step S1110, the CPU 106 determines whether or not an instruction to enable the HSM setting has been made by pressing the button 1201 for enabling HSM setting. Here, if it is determined that the button 1201 for enabling HSM setting has been pressed, the CPU 106 advances the procedure to step S1111 to enable the HSM setting, and advances the procedure to step S1112. By adopting a configuration in which, due to such processing, the HSM setting cannot be enabled unless the HSM encryption key is backed up without fail, it becomes possible to prevent the user from forgetting to back up the HSM encryption key.

Next, in step S1112, the CPU 106 displays, on the HSM setting management screen, a state where HSM function setting is enabled.

Figure 12C:
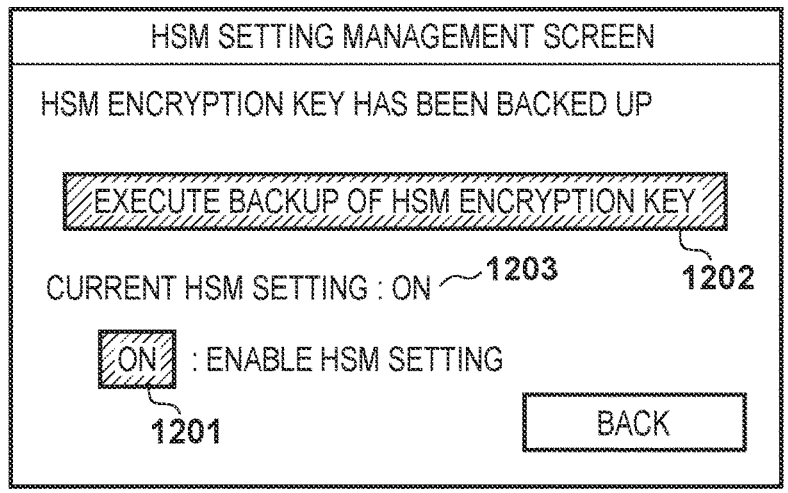

FIG. 12C depicts a view showing an example of the HSM setting management screen displayed on the console unit 111 of the multi-function peripheral 100 in step S1112 in FIG. 11, and here, shows an example of a screen indicating that the HSM setting has been enabled.

In FIG. 12C, the HSM setting is enabled, and the HSM encryption key has been backed up, and thus the current HSM setting 1203 is set to ON, and the button 1201 for enabling HSM setting is displayed in a grayed out manner so as not to be operable. Furthermore, the button 1202 for instructing execution of backup of the HSM encryption key is displayed in a grayed out manner so as not to be operable.

As described above, according to the third embodiment, a configuration can be adopted in which, in a multi-function peripheral in which the HSM encryption key can be backed up before HSM setting is enabled, the HSM setting cannot be enabled unless the HSM encryption key is backed up without fail. This makes it possible to prevent the user from forgetting to back up the HSM encryption key when the HSM setting is enabled.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-152288, filed Aug. 2, 2016, which is hereby incorporated by reference herein in its entirety.

What is claimed is:

1. An information processing apparatus having a hardware security module (HSM), comprising:
   a memory device that stores a set of instructions; and
   at least one processor that executes the instructions to:
      determine whether or not an encryption key of the HSM is able to be backed up;
      perform control to be able to receive an instruction to enable an HSM function that performs encryption and decryption of data using the encryption key under a condition that it is determined that the encryption key of the HSM is able to be backed up in a backup storage;
      upon receiving an instruction to enable the HSM function, set the HSM function to be enabled; and
      back up the encryption key.

2. The information processing apparatus according to claim 1,
   wherein the at least one processor executes instructions in the memory device to:
   when setting the HSM function to be enabled, perform control to back up the encryption key of the HSM in the backup.

3. The information processing apparatus according to claim 1,
   wherein
   the determination whether or not the encryption key of the HSM is able to be backed up is based on whether or not an external memory for storing the encryption key of the HSM is connected, or whether or not the external memory has a free storage area in which the encryption key of the HSM is able to be stored.

4. The information processing apparatus according to claim 1,
   wherein the at least one processor executes instructions in the memory device to:
   display an instruction portion for giving the instruction to enable the HSM function, and
   in a case that the instruction to enable the HSM function is able to be received, display the instruction portion to be operable, and in a case that the instruction to enable the HSM function is not able to be received, display the instruction portion not to be operable.

5. An information processing apparatus having a hardware security module (HSM), comprising:
   a memory device that stores a set of instructions; and
   at least one processor that executes the instructions to:
      determine whether or not an encryption key of the HSM is able to be backed up;
      perform control to be able to receive an instruction to enable an HSM function that performs encryption and decryption of data using the encryption key under a condition that it is determined that the encryption key of the HSM is able to be backed up in a backup storage;
      determine whether or not an HSM function is enabled;
      determine whether or not the encryption key of the HSM has been backed up; and
      if it is determined that the HSM function is enabled, and that the encryption key of the HSM has not been backed up, perform control to back up the encryption key of the HSM.

6. The information processing apparatus according to claim 5,
   wherein the at least one processor executes instructions in the memory device to:
   display a screen for prompting a user to back up the encryption key of the HSM in the control.

7. The information processing apparatus according to claim 5,
   wherein the at least one processor executes instructions in the memory device to:
   determine whether or not the HSM function is enabled when a user logs in.

8. The information processing apparatus according to claim 5,
   wherein the at least one processor executes instructions in the memory device to:
   if it is determined that the HSM function is not enabled, and that the encryption key of the HSM has not been backed up, further perform control to display a screen for receiving an instruction to back up the encryption key of the HSM in the control.

9. The information processing apparatus according to claim 5,
   wherein the at least one processor executes instructions in the memory device to:
   if it is determined that the HSM function is not enabled, and that the encryption key of the HSM has been backed up, further perform control to display a screen for receiving an instruction to enable the HSM function in the control.

10. The information processing apparatus according to claim 1,
    wherein the at least one processor executes instructions in the memory device to:
    back up the encryption key of the HSM in accordance with an instruction from a user that has administrative authority in the backup.

11. A method of controlling an information processing apparatus having a hardware security module (HSM), the method comprising:
    determining whether or not an encryption key of the HSM is able to be backed up;
    performing control to be able to receive an instruction to enable an HSM function that performs encryption and decryption of data using the encryption key under a condition that it is determined that the encryption key of the HSM is able to be backed up in a backup storage;
    upon receiving an instruction to enable the HSM function, setting the HSM function to be enabled; and
    backing up the encryption key.

12. A non-transitory computer-readable storage medium storing a program for causing a processor to execute a method of controlling an information processing apparatus having a hardware security module (HSM), the method comprising:
- determining whether or not an encryption key of the HSM is able to be backed up;
- performing control to be able to receive an instruction to enable an HSM function that performs encryption and decryption of data using the encryption key under a condition that it is determined that the encryption key of the HSM is able to be backed up in a backup storage;
- upon receiving an instruction to enable the HSM function, setting the HSM function to be enabled; and
- backing up the encryption key.

* * * * *